United States Patent [19]

Sukkar

[11] Patent Number: 5,613,037
[45] Date of Patent: Mar. 18, 1997

[54] REJECTION OF NON-DIGIT STRINGS FOR CONNECTED DIGIT SPEECH RECOGNITION

[75] Inventor: Rafid A. Sukkar, Aurora, Ill.

[73] Assignee: Lucent Technologies Inc., Murray Hill, N.J.

[21] Appl. No.: 171,071

[22] Filed: Dec. 21, 1993

[51] Int. Cl.$^6$ .................................................. G10L 5/06
[52] U.S. Cl. ........................ 395/2.65; 395/2.6; 395/2.64
[58] Field of Search .................................. 395/2.64, 2.65, 395/2.66, 45, 2.52, 2.82

[56] References Cited

U.S. PATENT DOCUMENTS

| | | | |
|---|---|---|---|
| 5,125,022 | 6/1992 | Hunt et al. ................................. | 379/88 |
| 5,127,043 | 6/1992 | Hunt et al. ................................. | 379/88 |
| 5,218,668 | 6/1993 | Higgins et al. ............................. | 395/2 |
| 5,228,087 | 7/1993 | Bickerton ................................... | 381/43 |
| 5,303,299 | 4/1994 | Hunt et al. ................................. | 379/88 |
| 5,425,129 | 6/1995 | Garman et al. ......................... | 395/2.65 |
| 5,440,662 | 8/1995 | Sukkar .................................... | 395/2.45 |
| 5,450,524 | 9/1995 | Rissanen ................................. | 395/2.54 |
| 5,509,104 | 4/1996 | Lee et al. ................................ | 395/2.65 |

OTHER PUBLICATIONS

Chou et al., "Segmental GPD Training of HMM Based Speech Recognizer," 0–7803–0532–9/92, IEEE 1992, pp. I-473–I-476.

Lippmann, et al., "Hybrid Neural–Network/HMM Approaches to Wordspotting," ICASSP '93: Acoustics Speech & Signal Processing, Apr. 1993, pp. I-565–I-568.

"Continuous Word Spotting For Applications in Telecommunications," Ming–Whei Feng, Baruch Mazor—*1992 International Conference on Spoken Language Processing*, Banff, Canada, Oct. 1992, pp. 21–24.

"Accessing Custom Calling Telephone Services Using Speech Recognition," Rafid A. Sukkar, Kevin V. Kinder—*ICSPAT—The International Conference on Signal Processing Applications and Technology*, Boston '92, Nov. 2–5, 1992, pp. 994–999.

"Speech Recognition Using Segmented Neural Nets", by S. Austin, G. Zavaliagkos, J. Makhoul, R. Schwartz, IEEE 0–7803–0532–9/92, 1992, pp. I-625–I-628.

"Continuous Word Spotting For Applications In Telecommunications", by M–W Feng & B. Mazor, Tu.sAM.1.5, pp. 21–24.

"Automatic Recognition of Keywords in Unconstrained Speech Using Hidden Mark Models", by J. G. Wilpon, L. R. Rabiner, C–H. Lee, E. R. Goldman, 0096–3518/90/1100–1870$01.00, 1990 IEEE, pp. 1870–1878.

"A Hidden Markov Model Based Keyword Recognition System", by R. J. Rose & D. B. Paul, CH2847–2/90/0000–0129, 1990 IEEE, pp. 129–131.

"An Introduction to Hidden Markov Models", by L. r. Rabiner & B. R. Land, IEEE ASSP Magazine, Jan. 1986, pp. 4–16.

"Discriminative Analysis For Feature Reduction In Automatic Speech Recognition", by E. L. Bocchieri & J. G. Wilpon, 0–7803–0532–9/92, IEEE 1992, pp. I-501–I-504.

"Improvements in Connected Digit Recognition Using Higher Order Spectral and Energy Features", by J. G. Wilpon, C–H. Lee, L. R. Rabiner, CH2977–7/91/0000–0349, 1991 IEEE, pp. 349–352.

*Primary Examiner*—Allen R. MacDonald
*Assistant Examiner*—Thomas J. Onka
*Attorney, Agent, or Firm*—Michael B. Johannesen

[57] ABSTRACT

A high reliability digit string recognizer/rejection system that processes spoken words through an HMM recognizer to determine a string of candidate digits, a filler model for each digit in the digit string, and other information. Next, a weighted sum is generated for each digit in the string and for a filler model for each digit in the string. A confidence score is generated for each digit by subtracting the filler weighted sum from the digit weighted sum. The confidence score for each digit is then compared to a threshold and, if the confidence score for any of the digits is less than the threshold, the entire digit string is rejected. If the confidence scores for all of the digits in the digit string are equal to or greater than the threshold, then the candidate digit string is accepted as a digit string.

7 Claims, 4 Drawing Sheets

REJECTION OF NON-DIGIT STRINGS FOR CONNECTED DIGIT SPEECH RECOGNITION

TECHNICAL FIELD

This invention relates to the field of automated speech recognition, and, more specifically, to a method and apparatus using a post-processor to a Hidden Markov Model speech recognizer to determine whether the recognizer has properly recognized a connected digit string in the input speech.

BACKGROUND OF THE INVENTION

Automatic recognition of spoken connected digit strings has become an important issue in the telephone industry. "Connected digits" are spoken strings of digits that are unbroken by other words. Telephone numbers and credit card numbers are examples of connected digits. Automatic recognition of connected digits has been the focus of many research efforts. For example, the papers by J. G. Wilpon, C.-H. Lee, and L. R. Rabiner, "Improvements in connected digit recognition using higher order spectral and energy features," Proc. IEEE International Conference of Acoustics, Speech, and Signal Processing (ICASSP), pp. 349–352, May 1991, and R. Cardin, Y. Momandin, and R. De Mori, "High performance connected digit recognition using codebook exponents," Proc. ICASSP, Vol. I, pp. 505–508, March 1992, both address this issue. Through these papers and the efforts of others, significant advances have been made resulting in a recognition accuracy that is acceptable for many applications. However, to be deployable in an actual telephony application, such as recognition of spoken telephone numbers or credit card numbers, especially with users unfamiliar with the technology, a connected digit recognizer must be robust over a wide range of user behavior. For instance, the ability to detect cases where the input speech does not contain a connected digit string is an important feature of the recognizer.

The Hidden Markov Model (HMM) speech recognizer is the preferred recognizer for enabling machines to recognize human speech. An HMM recognizer develops a candidate word by determining a best match between the spectral content of the input speech and the predetermined word models of its vocabulary set. HMM recognizers also determine segmentation information (i.e., the beginning and end of the candidate word) and a likelihood score that represents whether the candidate word is more or less probable. For many applications, this likelihood score can be compared to a threshold to determine whether the candidate word is present in the input speech, or whether to reject it.

This simple rejection method based on the HMM likelihood comparison, however, is not sufficiently reliable for many applications. This rejection method cannot reliably detect utterances that contain a connected digit string, and reject utterances that do not contain a connected digit string, which are two important features of a reliable connected digit recognizer. Furthermore, in most applications, it is desirable to reject a connected digit string that has been misinterpreted by the recognizer (e.g., substitution of one number for another), since rejection in such cases is a "softer" error than causing misconnection or misbilling due to the incorrect recognition. In this case, it is more desirable to have rejection simply followed by reprompting.

Many elaborate rejection methods have been proposed, some in the context of word spotting for conversational speech monitoring, and others in the context of word spotting for telecommunications applications. For example, U.S. patent application Ser. No. 07/989,299, filed Dec. 11, 1992, by the present applicant and assigned to the assignee hereof, describes a keyword/non-keyword classification (rejection) system in the context of word spotting for isolated word recognition in telecommunications applications. In that patent application, the output of a Hidden Markov Model (HMM) detector is post-processed by a two-pass classification system that derives a value for a keyword model that may be applied to a threshold on which a keyword verses non-keyword determination may be based. A first pass comprises Generalized Probabilistic Descent (GPD) analysis which uses feature vectors of the spoken words and HMM segmentation information (developed by the HMM detector during processing) as inputs to develop confidence scores. The GPD confidence scores are obtained through a linear combination (a weighted sum) of a processed version of the feature vectors of the speech. The confidence scores are then delivered to a second pass, which comprises a linear discrimination method using both the HMM scores and the confidence scores from the GPD stage as inputs. The linear discrimination method combines the two sets of input values using a second weighted sum. The output of the second stage may then be compared to a predetermined threshold by which a determination of whether the utterance was a keyword or not may be made.

Using such an HMM keyword rejection method for connected digits, however, requires that the HMM recognizer compare the utterance to all possible strings (every digit combination). For seven digit telephone numbers, that is $7^{11}$ possible combinations (seven digits and 11 possible numbers: 1–9, "oh" and "zero"). For credit card numbers which have many more digits, this computational effort is often too great to be practical.

Therefore, a problem is that using prior art rejection techniques for connected digit is neither reliable enough nor efficient enough for connected digit applications that require high reliability and reasonable computational complexity, such as telephone systems and credit card applications.

SUMMARY OF THE INVENTION

This problem is solved and a technical advance is achieved in the art by a system and method that recognizes digit strings with a high degree of reliability by processing the spoken words (utterances) through an HMM recognizer to determine a string of candidate digits and other related information. A confidence score is generated for each digit using a model of the candidate digit and the other information. The confidence score for each digit is then compared to a threshold and, if the confidence score for any of the digits is less than the threshold whose value depends on the digit under test, the entire digit string is rejected. If the confidence scores for all of the digits in the digit string are equal to or greater than the threshold, then the candidate digit string is accepted as a recognition of an actual digit string.

BRIEF DESCRIPTION OF THE DRAWING

A more complete understanding of the invention may be obtained from a consideration of the following description in conjunction with the drawings, in which.

DETAILED DESCRIPTION

Figure 1:
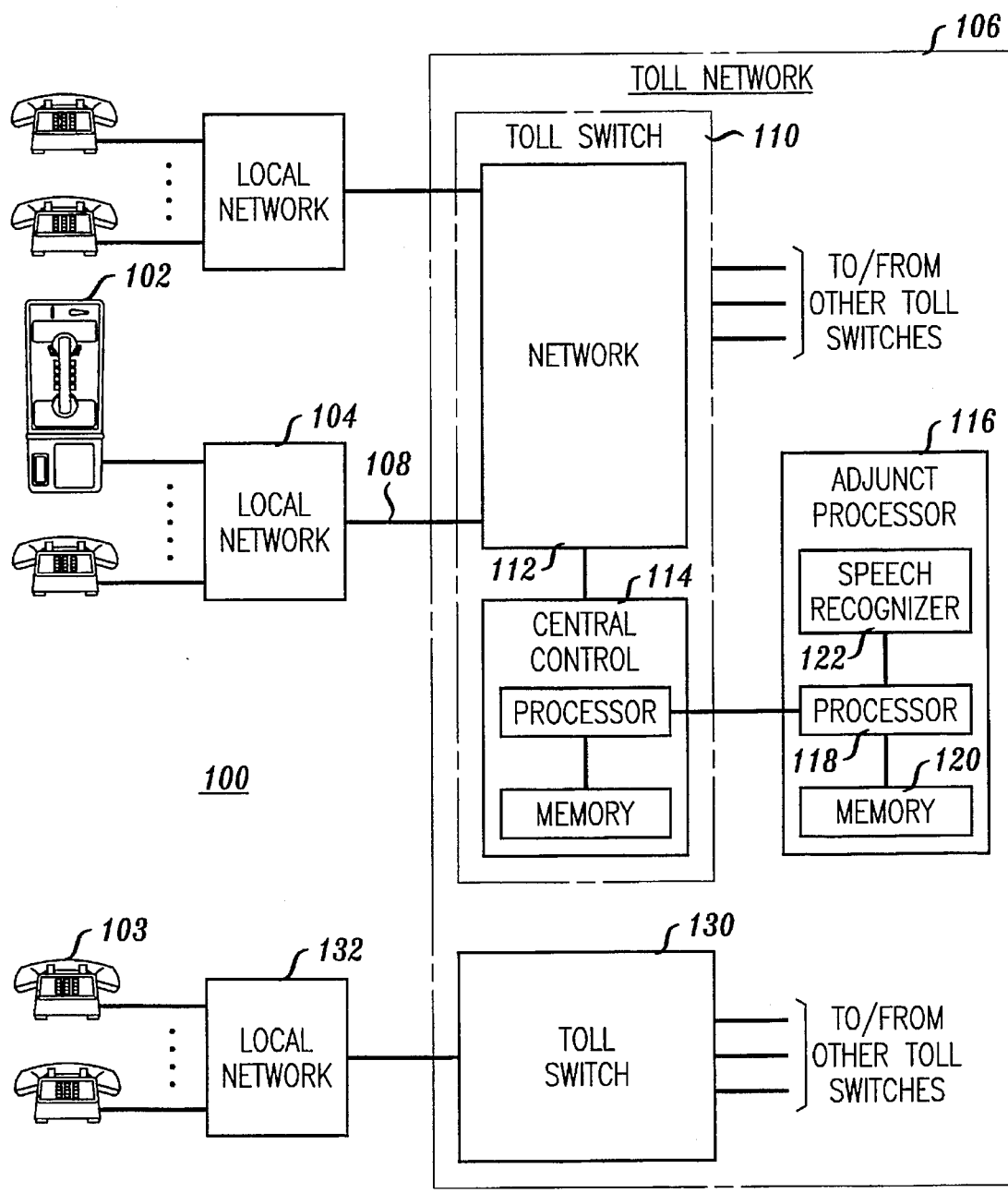
FIG. 1 is a block diagram of a telephone network illustrating a toll switch equipped with an adjunct processor wherein an exemplary embodiment of this invention may be practiced.

FIG. 1 is a block diagram of a telephone network 100 suitable for practicing an exemplary embodiment of this invention. A customer at a calling telephone, for example, pay phone 102, wishes to reach a telephone 103 (called telephone). The customer at pay phone 102 wishes to use a credit card to pay for the call. The customer dials the telephone number of called telephone 103; the number is analyzed by a local switch in local network 104 and determined to indicate a long distance or network call. Local network 104 sends the call into a toll network 106 by seizing an access trunk or channel 108, as is known in the art, to toll switch 110. The call is received in switching network 112 at toll switch 110.

As part of call setup, toll switch 110 records billing information. In this exemplary embodiment, a pay phone does not have billing information associated with it; therefore, central control 114 of toll switch 110 connects adjunct processor 116 to the call. Adjunct processor 116 collects credit card billing information from pay phone 102. For purposes of describing this invention, adjunct processor 116 uses an exemplary embodiment of this invention which collects credit card information verbally. However, this invention is not limited to this embodiment as this invention may be used to determine any verbally uttered digit string in any application.

Adjunct processor 116 comprises a plurality of service circuits such as speech recognizer 122, processor 118, and memory 120. Processor 118 connects the call through to speech recognizer 122. Speech recognizer 122 first prompts the customer at pay phone 102 in order to determine how the customer wants to pay for the call. Expected responses include "credit card," "collect," "third party," etc. To this end, speech recognizer 122 passes control to a system which recognizes keywords, such as the one described in the previously cited R. A. Sukkar, U.S. patent application. After a determination is made as to how the customer wishes to pay for the call, control is passed to another process within speech recognizer 122, by means of which the present invention is used to determine the digit string of numbers for a credit card or conversely a telephone number for third party billing or collect calling.

Processor 118 then causes the system to audibly prompt the customer at pay phone 102 to speak the number. Speech recognizer 122 processes the verbal response received from the customer at pay phone 102, by first processing the spoken words (utterances) through an HMM recognizer to determine a string of candidate digits, a filler model for each candidate digit, and other information, as will be discussed below in connection with FIGS. 3 and 4. A filler model is a generalized HMM model of spoken words that do not contain digits. The input speech is matched to both the digit and filler models in order to generate discrimination vectors (which are defined below) for the digits and filler models. Next, the discrimination vectors are used to generate two weighted sums for each digit in the candidate string; one weighted sum for the candidate digit and one for a competing filler model. Then a confidence score is generated for each digit by subtracting the filler weighted sum from the digit weighted sum. The confidence score for each digit is then compared to a threshold and, if the confidence score for any of the digits in the candidate string is less than the threshold, the entire digit string is rejected. If rejected, the caller may then be reprompted. If the confidence scores for all of the digits in the digit string are equal to or greater than the threshold, then the candidate digit string is recorded as the billing number or credit card number (or other appropriate action is taken, as necessary) and call processing proceeds. Toll switch 110 then connects to a second toll switch 130 which completes the call to local network 132 and to called telephone 103.

Figure 2:
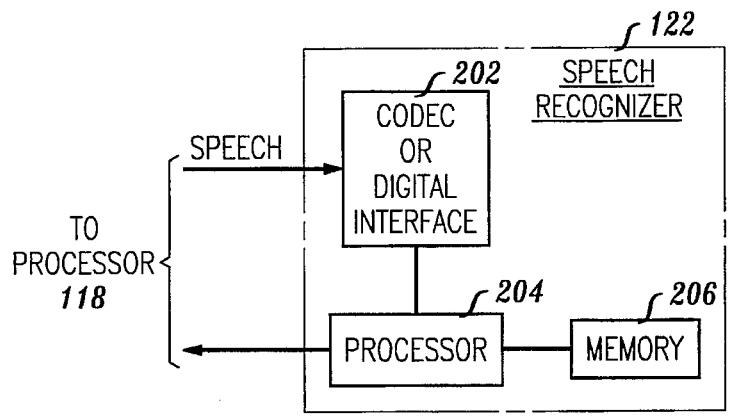
FIG. 2 is a more detailed block diagram of a speech recognizer of FIG. 1 wherein an exemplary embodiment of this invention may be practiced.

Turning now to FIG. 2, a speech processing unit 122 in which an exemplary embodiment of this invention may operate is shown. Incoming speech is delivered by processor 118 of adjunct processor 116 (FIG. 1) to CODEC or digital interface 202. CODEC 202, as is known in the art, is used in situations where the incoming speech is analog, and a digital interface is used in cases where incoming speech is in digital form. Once the incoming speech has been digitized, it is delivered to processor 204, which performs analysis of the speech. Memory 206, connected to processor 204, is used to store the digitized speech being processed and to store a program according to the exemplary embodiment of this invention. Processor 204 is responsive to the instructions of the program in memory 206 to process incoming speech and make a determination of a digit string and whether or not the digit string is good enough to be treated as valid, according to a program as described below in connection with FIGS. 5 and 6.

Figure 3:
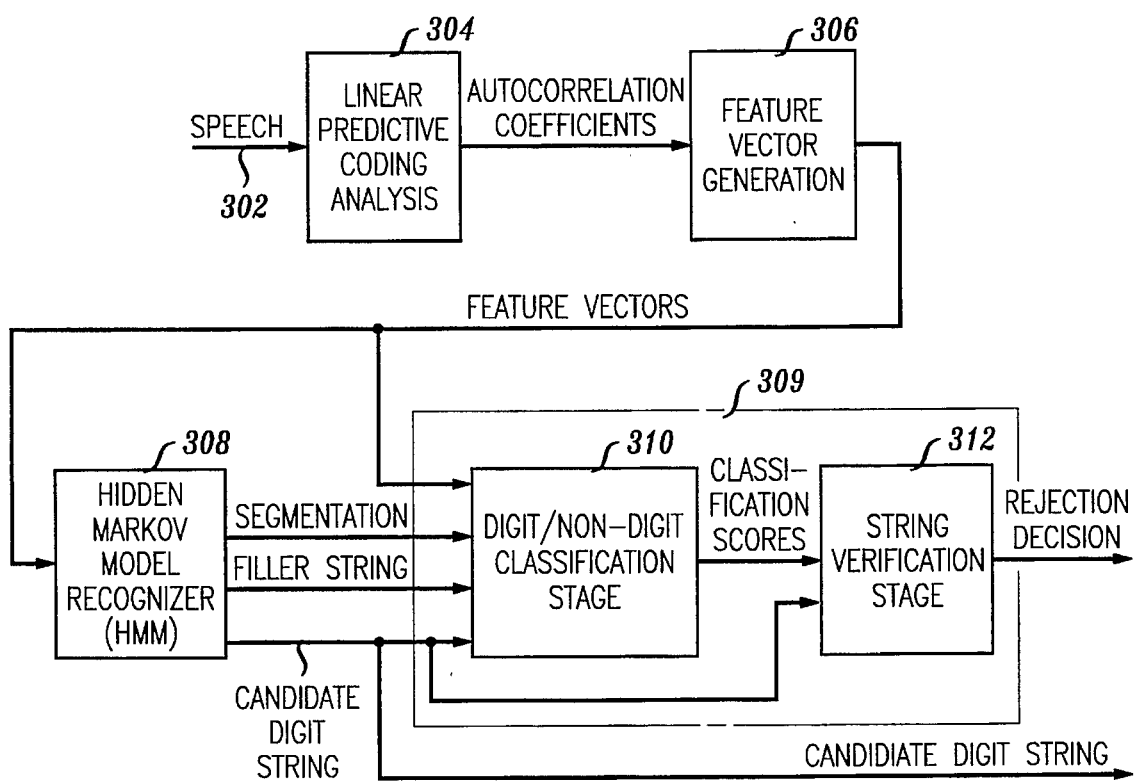
FIG. 3 is a functional block diagram of the processing performed in the speech recognizer of FIG. 2 according to an exemplary embodiment of this invention.

Turning now to FIG. 3, a block diagram of the basic functionality of the exemplary embodiment of this invention as it operates in the processor 204 of speech recognizer 122 of FIG. 2 is shown. Digitized speech sampled at 8 KHz is blocked into frames and is used as input 302 to a linear predictive coding analysis system 304. Linear predictive coding analysis 304 takes the digitized speech and produces auto-correlation coefficients which are used as an input to a feature vector generation system 306. Linear predictive coding analysis 304 and feature vector generation 306 represent each frame with 24 parameters. For purposes of describing the exemplary embodiment of this invention, a 10th order linear predictive coding analysis system is used having a 45 ms overlapping window length and 15 ms update rate. A total of 38 parameters are computed, consisting of the first 12 cepstral coefficients, their first derivatives (called the delta cepstral coefficients), the second derivatives (called delta-delta cepstral coefficients), delta energy, and delta-delta energy. To reduce the computational load, a subset of 24 of the 38 parameters is used to form a recognizer feature vector. This 24 parameter subset is optimally selected using discriminative analysis for future reduction, as described in E. L. Bocchieri and J. G. Wilpon, "Discriminative Analysis for Future Reduction in Automatic Speech Recognition," Proceedings ICASSP, pp. 501–504, March 1992. Linear predictive coding analysis delivers the first ten auto-correlation coefficients to feature vector generator 306. Feature vector generator 306 produces the 24 parameter subset on a frame-by-frame basis. This 24 parameter subset is presented in the Bocchieri and Wilpon article described above and in TABLE 1 of the previously cited Sukkar patent application, which is incorporated herein by reference.

Feature vector generator 306 delivers the 24 parameters to a Hidden Markov Model (HMM) recognizer 308, and to a digit/non-digit classification stage 310 according to this invention. In HMM recognizer 308, each HMM model (digit and filler) is modeled as a continuous density left-to-right HMM which uses eight to ten states, depending on the specific word model, with fifteen gaussian mixture components per state. The segmental k-means algorithm, as described in L. R. Rabiner, J. G. Wilpon, and B.-H. Juang, "A Segment K-Means Training Procedure for Connected Word Recognition," AT&T Technical Journal, Vol. 65, No. 3, pp. 21–31, May-June 1986, is used to estimate the HMM parameters and the well-known Viterbi decoding algorithm is employed to obtain the optimal HMM path.

Figure 4:
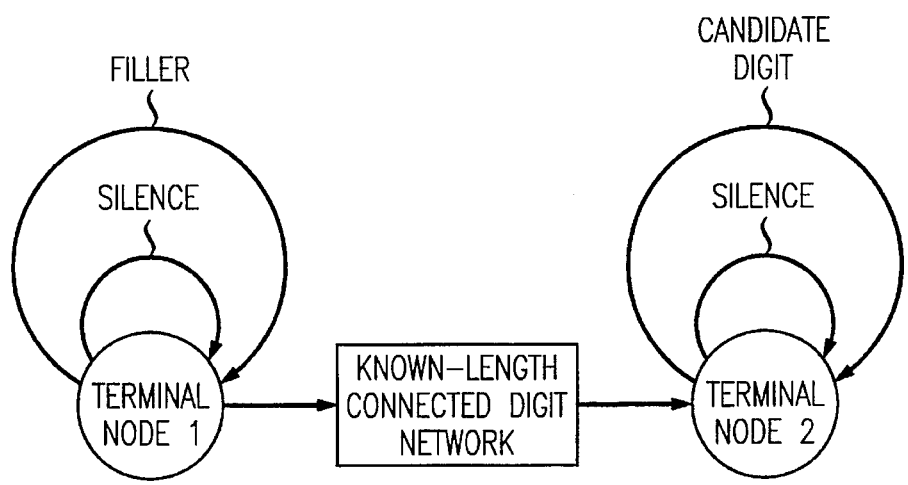
FIG. 4 is a block diagram of an HMM network for digit strings.

The HMM network used by HMM recognizer 308 is a known-length connected digit network, shown in FIG. 4. The silence model in this network models the background noise, while the filler model models extraneous speech that may occur on either side of a digit string. Both nodes 1 and 2 in FIG. 4 are terminal nodes, implying that two competing strings are produced: a digit string, and a filler string. The corresponding HMM word and state segmentation information is obtained for use in the rejection postprocessor, as will be discussed below. Although the specific HMM network employed here is a known-length network, this rejection method can also be applied to the unknown length case in a straight forward manner by one skilled in the art.

Returning to FIG. 3 rejection post processor 309, consists of two stages, the digit/non-digit classification stage 310, and the string verification stage 312. The digit/non-digit classifier 310 operates on each digit in the string to generate a classification score that is delivered to string verification stage 312. Based on these classification scores for all the digits, string verification stage 312 determines whether the input speech contains a connected digit string, and makes the final rejection decision.

Digit/Non-digit Classification Stage 310 comprises a classifier that is trained discriminatively to separate two classes. One class represents speech containing valid digits that are correctly recognized, while the other consists of two components: speech not containing a digit, and speech containing digits that are misrecognized by the HMM recognizer. Misrecognitions (i.e., substituting one digit for another) are included in the second class so that putative errors can also be rejected.

In any classification or pattern recognition problem dealing with time sequences, it is desirable to time-normalize the signal so that it can be represented by a fixed number of parameters. The fact that the HMM time-aligns the utterance into a fixed sequence of states allows the representation of the utterance by a fixed length vector. The fixed length vector transformation is accomplished, first, by taking the centroid of the feature vectors of all the frames in a given state. The centroid vectors corresponding to the states in a given HMM model are then concatenated to form a fixed length vector called the discrimination vector. In addition to the advantages gained by transforming variable length utterances into fixed length vectors, the discrimination vectors enables us to exploit the correlation that exists among states of a given digit model.

To facilitate discriminative training and real-time operation, the HMM network of FIG. 4 provides two terminal nodes, one matching the input speech to a digit string, and the other matching the speech to a filler model string. The digit class hypothesis is represented by the information available at the digit string terminal node (node 2), and the non-digit class hypothesis is represented by the information at the filler node (node 1).

In order to perform discrimination on a digit by digit basis, each digit in the recognized digit string is paired with a filler segment in the filler string, using the HMM word segmentation information. This is done by maximizing the temporal overlap between a given digit segment and the filler segments at the filler terminal node.

Discriminative training is performed using the Generalized Probablistic Descent (GPD) framework. In its original formulation, GPD discriminative training was developed to minimize recognition errors by optimization based on HMM model parameters. As a framework for discriminative training in this exemplary embodiment, GPD is used to train the digit/non-digit classifier. The inputs to the classifier are the candidate digit string, the filler string, the HMM state segmentation, and the input speech spectral parameters (i.e., feature vectors) for the digit under test. Training of digit/non-digit classification stage 310 is performed using GPD as generally described in W. Chou, B-H. Juang, and C-H. Lee, "Segmental GPD Training of HMM Based Speech Recognizer," Proc. ICASSP, Vol. 1, pp. 473, March 1992. Training (which is done off line prior to use) is performed by, first, defining a distance function, and then minimizing a monotonic smooth loss function that is itself a function of the distance function. The purpose of the loss function is to emphasize the separation of cases that are highly confusable while deemphasizing the less confusable cases.

Given a digit/filler segment pair, the GPD distance function is now defined for each of the two classes. For the digit class, the distance function is $$d_i(A_i) = -R(x_i, a_i) + R(x_{fi}, a_{fi}) \quad (1)$$

where i is the digit under test, $f_i$ is the filler model segment that is paired with digit model i, $x_i$ is the discrimination vector for digit model i, $x_{fi}$ is the discrimination vector for $f_i$, $a_i$ is the GPD weight vector for digit model i, $a_{fi}$ is the GPD weight vector for $f_i$, $A_i = [a_i\ a_{fi}]$, and $R(x_i, a_i)$ is a linear discrimination function defined as $$R(x_i, a_i) = x_i^t a_i \quad (2)$$

Therefore, given a valid digit segment, equation (1) suggests that the goal is to determine the two GPD weight vectors $a_i$ and $a_{fi}$ such that the digit discrimination function is much larger than the filler segment discrimination function. Conversely, in the case of the non-digit class, the goal is determine $a_i$ and $a_{fi}$ such that the filler segment discrimination function is much larger than the corresponding digit discrimination function. This leads to the definition of the distance function of the non-digit class, as follows, $$d_i(A_i) = R(x_i, a_i) - R(x_{fi}, a_{fi}) \quad (3)$$

The distance function of equations (1) and (3) is incorporated into a sigmoid shaped loss function defined as $$L_i(A_i) = \frac{1}{1 + e^{-\gamma d_i(A_i)}},$$

where $\gamma$ is a constant. For each digit in the vocabulary set (1–9, "oh" and "zero"), the loss function is minimized with respect to $a_i$ and $a_{fi}$ (or $A_i$), resulting in a separate $a_i$ and $a_{fi}$ set for each digit in the digit set. The minimization is carried through iteratively using the gradient descent method, as follows, $$(A_i)_{n+1} = (A_i)_n - \epsilon \nabla(L_i(A_i))_n,$$

where $(A_i)_n$ is the GPD weight vector at the $n^{th}$ training sample, $\nabla(L_i(A_i))_n$ is the gradient of the loss function with respect to $A_i$ evaluated at the $n^{th}$ training sample, and $\epsilon$ is the update step size.

Given an unknown speech segment with a discrimination vector pair $x_i$ and $x_{fi}$, the classification is performed by computing a confidence score, defined as $$C_i = R(x_i, a_i) - R(x_{fi}, a_{fi}).$$

The confidence scores for all the digits in the recognized string are then passed to the string verification stage 312 to make the string rejection decision.

The whole candidate string is verified (312, FIG. 3) based on the individual candidate digit confidence scores. Although there are various ways to combine the confidence scores to make the rejection decision, a simple approach is used in the exemplary embodiment of this invention. Each confidence score is compared to a predefined individual threshold that is a function of the digit under test. Each individual threshold varies as a function of the difficulty of detecting a specific digit. If any of the digits in the string does not pass the comparison test, the whole string is rejected.. In this way substitution errors of only a single digit in the string are likely to cause the string to be rejected, which is a desirable feature for many applications. Thus, this rejection method is successful in not only rejecting speech with no connected digits, but also in rejection putative errors that would have passed but for the rejection mechanism, and it does not require analysis of each possible combination of all digits. An alternate way of performing the string classification is that the confidence scores for all digits may be combined and compared to either a predefined threshold or a combination of selected thresholds.

Figure 5:
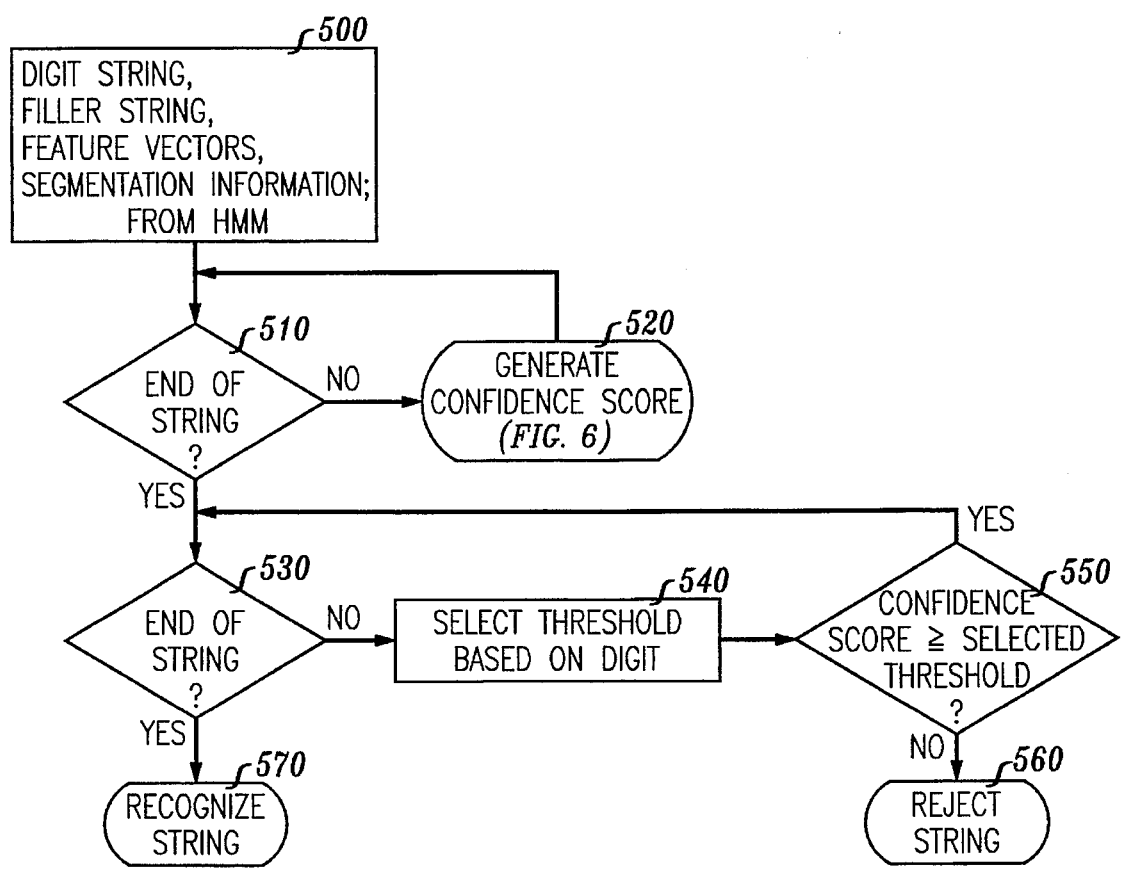
FIGS. 5 and 6 are flow charts describing the processing steps according to an exemplary embodiment of this invention.

FIG. 5 is a flow chart describing the operations performed in the rejection post processor 309 of FIG. 3. In box 500, the rejection post processor receives a digit string, a filler string, and segmentation information from the HMM recognizer 308 and a feature vector from feature vector generation 306. The digit string comprises a plurality of candidate digits that the HMM recognizer determines to be a best fit given the input utterance. The filler string comprises a string of models which describes noise or "garbage" models (i.e., non-digit models) that most closely correspond to the unknown input speech. The feature vector describes the input utterance spectral information, and the segmentation information describes the envelope for each digit, that is, where in time the HMM recognizer determines each digit to be. The next steps are performed for every recognized digit in the digit string delivered from the HMM recognizer. A determination is made in decision diamond 510 whether there is a digit to be processed. If there is digit to be processed, then in box 520 a confidence score is developed for the digit being analyzed. Box 520 is described further below in FIG. 6. After a confidence score has been generated for a particular digit in box 520, processing returns to decision diamond 510.

When there are no more digits to be processed, that is, a confidence score has been generated for each digit in the digit string, processing passes to decision diamond 530. A determination is made in decision diamond 530 if there is a digit to be processed. If there is, then processing proceeds to box 540, where a threshold value is selected based on the candidate digit. Processing proceeds to decision diamond 550 where the confidence score is compared to the selected threshold. If the confidence score is less than the selected threshold, then processing proceeds to circle 560 where the string is rejected because the confidence score for one of the digits in the string was less than the threshold. If, in decision diamond 550, the confidence score is greater than or equal to the selected threshold, then processing proceeds back to decision diamond 530 for additional digits.

Processing continues in this manner until, in decision diamond 530, a decision is made that there are no more digits to process. If there are no more digits to process, then all candidate digits in the recognized digit string have confidence scores greater than or equal to the selected threshold, and, thus, a digit string has been recognized. Processing proceeds to circle 570 where the candidate string is returned as the recognized digit string.

Figure 6:
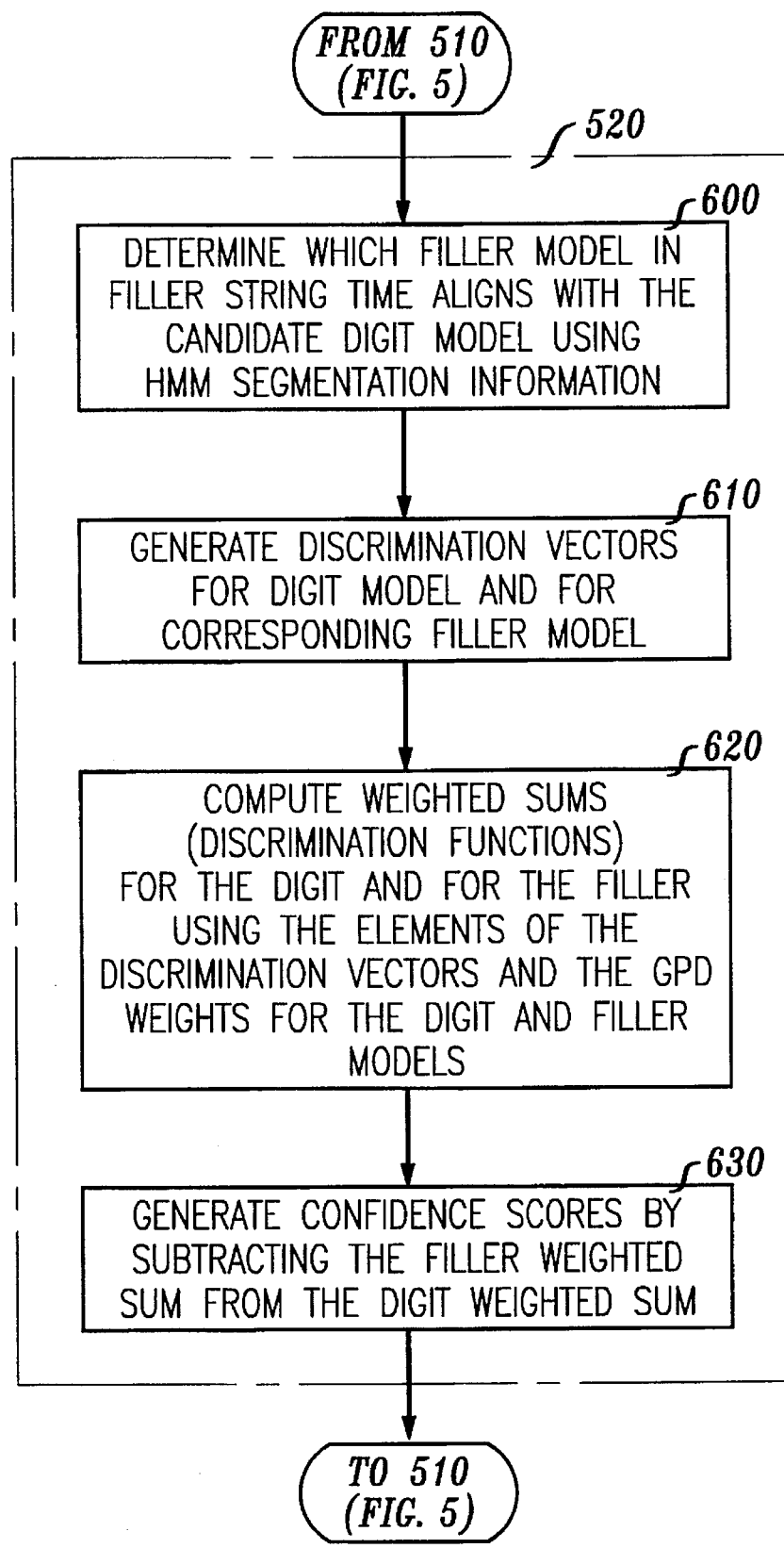

Turning now to FIG. 6, processing in the generate confidence score box 520 (FIG. 5) is shown. The operation of box 520 is entered from decision diamond 510. First, in box 600, a determination is made as to which filler model in the input filler string time aligns with the digit model for the digit under consideration. This is performed using the segmentation information for the digit under consideration and determining which filler model in the filler string matches the segmentation information for the digit under consideration. Next, in box 610, two discrimination vectors are generated. One discrimination vector is generated for the digit model for the digit under consideration, and one for the corresponding filler model. The discrimination vector generation process is described above.

Next, in box 620, the system computes two weighted sums (also called discrimination functions). One weighted sum is computed for the candidate digit under consideration and one for the candidate filler model. The weighted sums are computed using the elements of the discrimination vectors and the GPD weight vectors (which were predetermined offline, as described above) for the candidate digit and filler model. Processing proceeds to box 630 where confidence scores are generated by subtracting the filler weighted sum from the candidate digit discrimination function. These scores are stored for use in the confidence score comparison in decision diamond 550 (FIG. 5). Processing returns to decision diamond 510 in FIG. 5.

It is to be understood that the above-described embodiments are merely illustrative principles of the invention, and that many variations may be devised by those skilled in the art without departing from the scope of the invention. It is, therefore, intended that such variations be included within the scope of the appended claims.

I claim:

1. A method usable in a speech processor for establishing whether speech signals comprising digitized speech represents a connected digit string, said speech signals being previously processed into feature vectors, the method comprising the steps of:

processing said feature vectors in a Hidden Markov Model (HMM) recognizer and determining a string of candidate digits and a string of filler models;

matching each candidate digit in said candidate digit string to a corresponding filler model in said filler model string;

generating a weighted sum for each candidate digit in said string of candidate digits and a weighted sum for each filler model in said string of filler models;

generating a confidence score for each candidate digit in said candidate digit string by subtracting said filler weighted sum from said digit weighted sum; and comparing the resulting set of confidence scores to a threshold to determine whether a digit string has been detected.

2. A method according to claim 1 wherein said step of generating each digit weighted sum and each filler weighted sum comprises generating a discrimination vector for said candidate digit and a discrimination vector for said filler model; and computing said weighted sums by adding elements of said discrimination vectors weighted by elements of predetermined Generalized Probabilistic Decent (GPD) weight vectors for each candidate digit.

3. A method according to claim 2 wherein said GPD weight vectors are determined by minimizing a loss function thereby maximizing the separation between speech containing digits and speech not containing digits.

4. A method according to claim 1 wherein said comparing comprises comparing each one of said set of confidence scores to an individual threshold.

5. A method according to claim 4 wherein said individual threshold is selected according to the candidate digit.

6. A method according to claim 1 wherein said comparing comprises combining said set of confidence scores and comparing said combined confidence scores to a combined threshold.

7. A connected digit string detection apparatus that receives input signals representing digitized speech and signals representing feature vectors of said speech and determines whether said digitized speech includes a connected digit string, said apparatus comprising:

means responsive to said input signals for developing segmentation information regarding said speech signals using said feature vectors of said speech;

means for receiving said signals representing feature vectors and said segmentation information of filler models and digital strings and processing said feature vectors to generate discrimination vectors for said filler models and digit strings and performing a weighted sum on said discrimination vectors and GPD weight vectors to generate a set of confidence scores; and means for comparing said confidence scores for each candidate digit to a set of predetermined threshold and rejecting said candidate digit string if any of said confidence scores fails to satisfy its threshold.

* * * * *